(12) United States Patent
Jurado et al.

(10) Patent No.: US 7,256,528 B2
(45) Date of Patent: Aug. 14, 2007

(54) TIE RING

(75) Inventors: Augusto Xavier Jurado, Erie, PA (US); Ernesto Camilo Rivera, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/878,504

(22) Filed: Jun. 28, 2004

(65) Prior Publication Data

US 2005/0285465 A1    Dec. 29, 2005

(51) Int. Cl.
    *H00K 3/46* (2006.01)
(52) U.S. Cl. .......................... 310/270; 310/71
(58) Field of Classification Search ............ 310/260, 310/270, 71, 91, 261, 264
    See application file for complete search history.

(56) References Cited

U.S. PATENT DOCUMENTS

| 849,670 | A | * | 4/1907 | Forster ....................... 310/260 |
| 940,632 | A | * | 11/1909 | Behrend ....................... 310/260 |
| 3,908,143 | A | * | 9/1975 | Buncher ....................... 310/260 |
| 4,016,443 | A | * | 4/1977 | Johnson ....................... 310/260 |
| 4,752,708 | A | * | 6/1988 | Jager et al. ................... 310/260 |
| 6,856,055 | B2 | * | 2/2005 | Michaels et al. .............. 310/71 |
| 6,903,470 | B2 | * | 6/2005 | Doherty et al. ................ 310/59 |

* cited by examiner

*Primary Examiner*—Dang Le
(74) *Attorney, Agent, or Firm*—Carlos L. Hanre; Steven M. McHugh

(57) ABSTRACT

A tie ring is provided wherein the tie ring includes a tie ring structure defining at least one strap cavity. The tie ring structure includes a tie ring top surface and a tie ring bottom surface, wherein the tie ring top surface defines at least one top surface opening and wherein the tie ring bottom surface defines at least one bottom surface opening, wherein the at least one top surface opening and the at least one bottom surface opening are communicated with the at least one strap cavity.

15 Claims, 11 Drawing Sheets

Section B - B

Section A - A

Section B - B

TIE RING

FIELD OF THE INVENTION

This disclosure relates generally to an alternator for off-highway vehicles and more particularly to an alternator tie ring design for reducing the overall stress level on an alternator pole terminal.

BACKGROUND OF THE INVENTION

In order to haul the heavy payloads generated from mining rock and minerals from the earth, such as those excavated from an open-pit mine or quarry, a large off-highway, heavy-duty work vehicle 100, such as that shown in FIG. 1, is typically required. This type of heavy-duty vehicle 100 employs motorized wheels for propelling and retarding the vehicle 100 in an energy efficient manner, where the energy efficiency is typically achieved by employing a large horsepower diesel engine 102 in conjunction with an alternator 104 and a main traction inverter 106. The diesel engine 102 drives the alternator 104 in order to power the main traction inverter 106, which controls the voltage and frequency of the electric power being supplied to drive motors 108 disposed within the rear wheels 110 of vehicle 100. As drive motors 108 are operated, the drive motors 108 cause a transmission drive shaft to rotate at a low torque and high speed about the drive shaft axis. The transmission drive shaft transfers this low torque high speed rotational energy to the vehicle transmission which converts this energy into a high torque low speed rotational energy output that is supplied to the rear wheels 110.

Referring to FIG. 2, the alternator 104 used in this type of vehicle is typically a main 3-phase traction alternator having a rotor 112 that is directly associated with the output shaft of the diesel engine 102 such that any rotational movement of the output shaft translates into rotational movement of the rotor 112. Thus, when the diesel engine 102 is operated, the rotation of the output shaft causes a corresponding rotation of the alternator rotor 112. When an excitation current is applied to the field windings of the rotating rotor 112, a voltage is generated in the armature windings on the stator of the alternator 104 responsive to the rotation of the rotor 112. Thus, it follows that the output power of the alternator 104 is responsive, at least in part, to the rotational speed of the engine 102. As such, the faster the output shaft rotates, the faster the alternator rotor 112 rotates and the more power is generated by the alternator 104.

In order for heavy-duty work vehicles 100 to be able to haul their heavy payloads or to accelerate from rest, a large amount of power is needed. Because the power generated by the alternator 104 is proportional to the rotation of the alternator rotor 112, as discussed hereinabove, the alternator rotor 112 must be rotated at speeds up to 1900 revolutions per minute (RPM's) in order to generate the amount of power required to propel these vehicles 100. It is well known that rotor rotational speeds this high generate a large amount of stress loads (both centrifugal and axial) on components disposed within the alternator 104, such as a plurality of connection straps 116 which are used to connect the alternator winding sets together in a series fashion.

As shown in FIG. 2, FIG. 3 and FIG. 4, current tie ring assembly designs employ a fiberglass tie ring body 118 which provides support to the plurality of connection straps 116. These connection straps 116 typically include a first strap connector 120 associated with a second strap connector 122 via a strap body 124, wherein the strap body 124 is associated with the tie ring body 118 using clamps and/or tape. The connection straps 116 are used to connect like poles from each set of alternator windings in a series fashion, wherein first strap connector 120 is connected to a pole from one set of alternator windings and second strap connector 122 is connected to the like pole from an adjacent set of alternator windings. Because each set of alternator windings has at least two poles, two connection straps 116 are typically required to connect one set of alternator windings to an adjacent set of alternator windings. Moreover, because one pole is disposed on one side of the set of alternator windings and the other pole is disposed on the opposing side of the set of alternator windings, there may be connection straps 116 disposed on both the internal and external surfaces of the tie ring body 118. Unfortunately however, as the alternator rotor 112 is rotated at high speeds, large centrifugal forces $C_f$ are generated, as shown in FIG. 5. This centrifugal force $C_f$ produces a tendency in the connection straps 116 to move away from the axis of rotation h, disposed in the center of the alternator rotor 112, in a direction perpendicular to the external surface of the tie ring body 118.

This can be seen more clearly by referring to FIG. 5, where a top down view of alternator rotor 112 is shown having only tie ring body 118 and a plurality of connection straps 116. Plurality of connection straps 116 include a plurality of internally disposed connection straps 126 and a plurality of externally disposed connection straps 128, wherein internally disposed connection straps 126 and externally disposed connection straps 128 connect one pole of one set of alternator windings to a similar pole of an adjacent set of alternator windings. As the alternator rotor 112 is rotated about its axis h, in this case in the clockwise direction, a centrifugal force $C_f$ (represented by the arrows in FIG. 4) is generated producing a tendency in the strap body 124 of both the internally disposed connection straps 126 and the externally disposed connection straps 128 to move away from the axis of rotation h in a direction perpendicular to the external surface of tie ring body 118.

As the centrifugal forces $C_f$ increase, the tendency of the internally disposed connection straps 126 to move away from the axis of rotation is counteracted by the internal surface wall of tie ring body 118. Thus, the stresses on the internally disposed connection straps 126 due to centrifugal forces $C_f$ are essentially equalized by the internal surface wall of the tie ring body 118. However, as the centrifugal forces $C_f$ increase, the tendency of the externally disposed connection straps 128 to move away from the axis of rotation is counteracted only by the clamps and tape holding the externally disposed connection straps 128 to the external surface of tie ring body 118. As the clamps and tape wear with use and age, the strap body 124 begins to move becoming less secure. This puts stress on the connection between the first strap connector 120, the second strap connector 122 and the poles of the windings.

Although this design provides sufficient support for tie rings on vehicles that generate alternator rotor rotation speeds of approximately 1050 RPM's, such as a locomotive, this design is inadequate to provide the support needed to sustain the higher stress loads generated by the higher rotor rotation speeds of large off-highway heavy duty work vehicles 100, due to centrifugal forces, axial forces, thermal expansion and vibrational forces. Because of this design limitation, the larger rotation speed decreases the life span of the connection strap 116 and increases the probability that connection strap 116 may fail, possibly causing extensive and/or irreparable damage to the alternator. Thus, at the very least, a failure of connection strap 116 may require that the alternator be removed and connection strap 116 be replaced and at the very worse, a failure in the connection strap 116 may irreparably damage the alternator. Each of these scenarios is undesirable because alternators of this type are very large, very heavy, very cumbersome to work with and very expensive to replace and repair.

SUMMARY OF THE INVENTION

A tie ring is provided and includes a tie ring structure defining at least one strap cavity. The tie ring structure includes a tie ring top surface and a tie ring bottom surface, wherein the tie ring top surface defines at least one top surface opening and wherein the tie ring bottom surface defines at least one bottom surface opening, wherein the at least one top surface opening and the at least one bottom surface opening are communicated with the at least one strap cavity.

A tie ring assembly is provided and includes a tie ring structure defining at least one strap cavity. The tie ring structure includes a tie ring top surface and a tie ring bottom surface, wherein the tie ring top surface defines at least one top surface opening and wherein the tie ring bottom surface defines at least one bottom surface opening, the at least one bottom surface opening being communicated with the at least one top surface opening via the at least one strap cavity. Moreover, at least one terminal connection strap is provided, wherein the at least one terminal connection strap includes a first connection strap end connected to a second connection strap end via a strap body. The at least one terminal connection strap is disposed within the at least one strap cavity such that strap body is contained within the at least one strap cavity and such that the first connection strap end and the second connection strap end are communicated with the at least one bottom surface opening.

An alternator assembly is provided and includes an alternator support structure, wherein the alternator support structure defines an alternator shaft cavity and includes an alternator support structure external portion and an alternator shaft, wherein the alternator shaft is non-movably disposed within the shaft cavity. The alternator assembly also includes a plurality of alternator rotor windings, wherein the plurality of the alternator rotor windings are disposed to be non-movably associated with alternator support structure external portion such that the alternator rotor windings are evenly distributed along the alternator support structure external portion.

The alternator assembly also includes a tie ring assembly, wherein the tie ring assembly includes a tie ring structure defining at least one strap cavity, the tie ring structure including a tie ring top surface and a tie ring bottom surface, wherein the tie ring top surface defines at least one top surface opening and the tie ring bottom surface defines at least one bottom surface opening, wherein the at least one bottom surface opening is communicated with the at least one top surface opening via the at least one strap cavity and at least one terminal connection strap, the at least one terminal connection strap including a first connection strap end connected to a second connection strap end via a strap body, wherein the at least one terminal connection strap is disposed within the at least one strap cavity such that strap body is contained within the at least one strap cavity and such that the first connection strap end and the second connection strap end is communicated with the at least one bottom surface opening.

BRIEF DESCRIPTION OF THE DRAWINGS

The foregoing and other features and advantages of the present invention will be more fully understood from the following detailed description of illustrative embodiments, taken in conjunction with the accompanying drawings in which like elements are numbered alike in the several Figures.

DETAILED DESCRIPTION OF THE INVENTION

Figure 1:
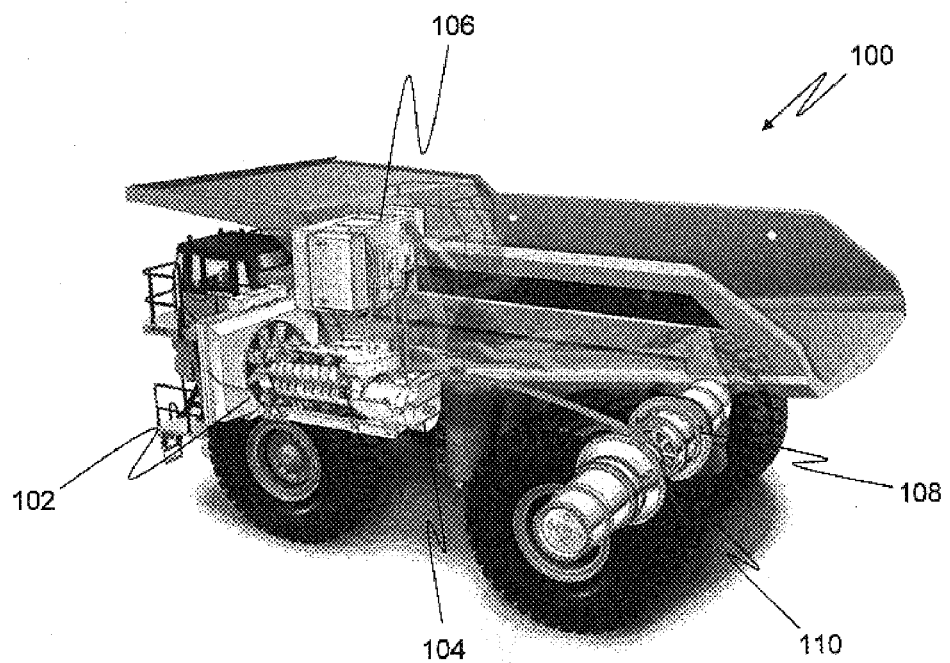
FIG. 1 is a side perspective view of an off-highway, heavy-duty work vehicle of the type that uses a rotor alternator.
Figure 2:
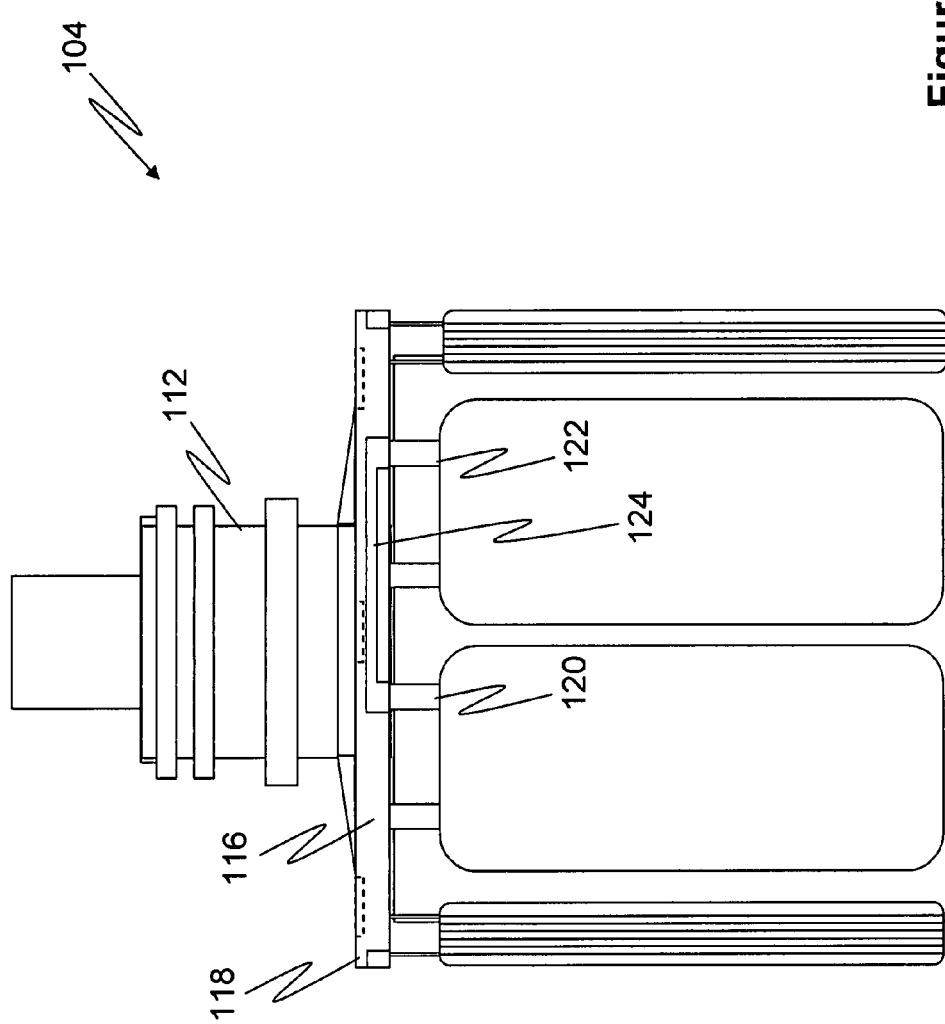
FIG. 2 is a side view of the rotor alternator, in accordance with the prior art.
Figure 3:
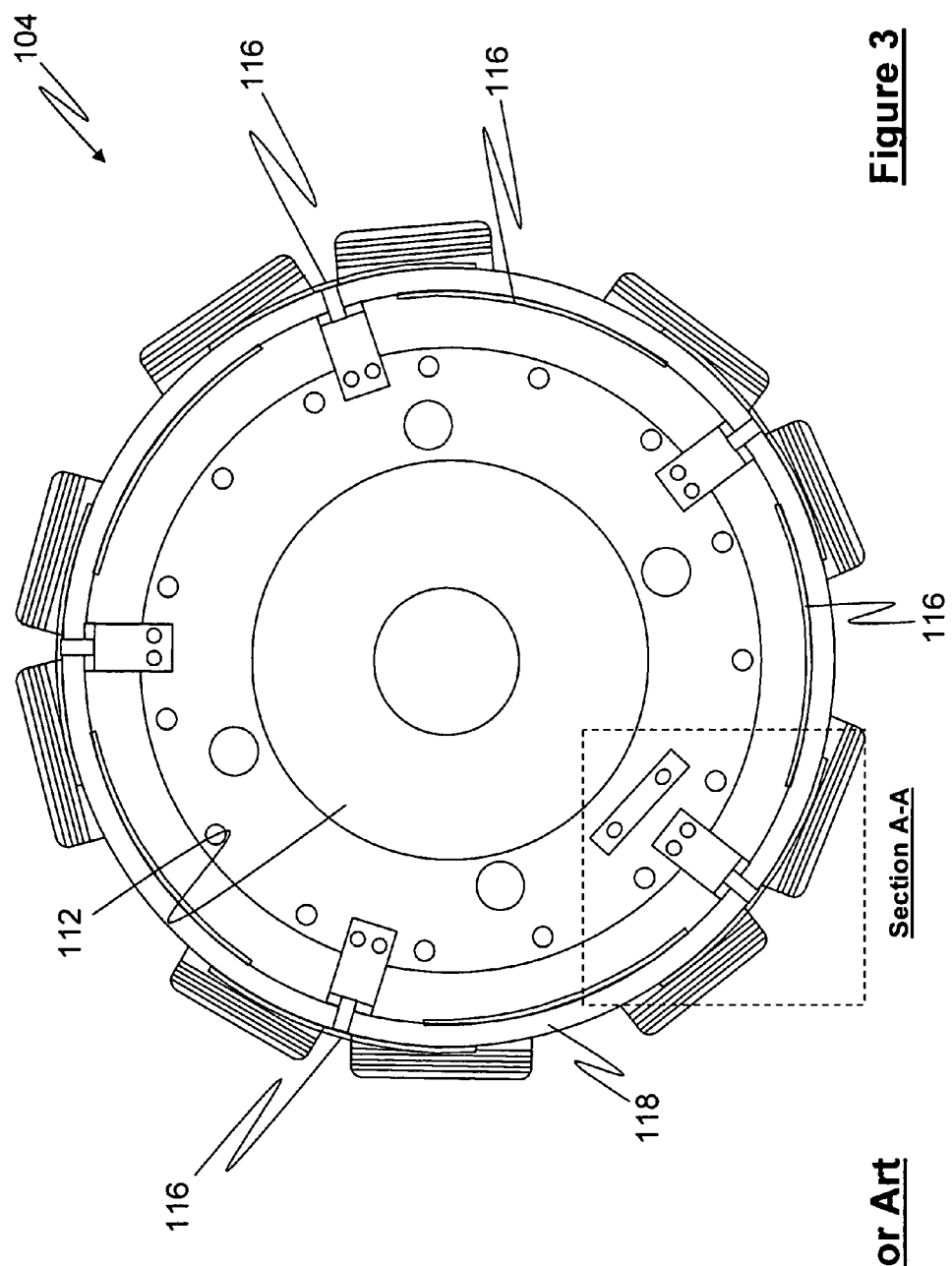
FIG. 3 is a top down view of the rotor alternator of FIG. 2.
Figure 4:
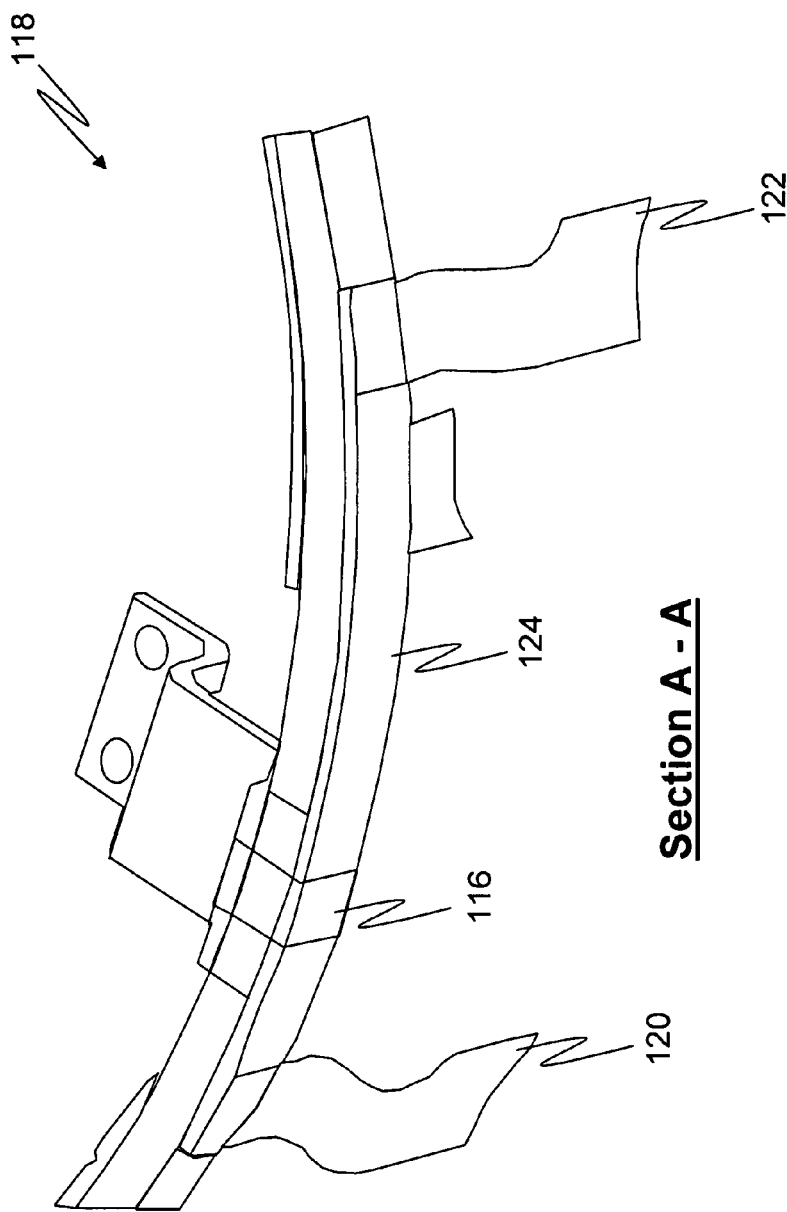
FIG. 4 is a sectional side perspective view of a tie ring of the rotor alternator of FIG. 2.
Figure 5:
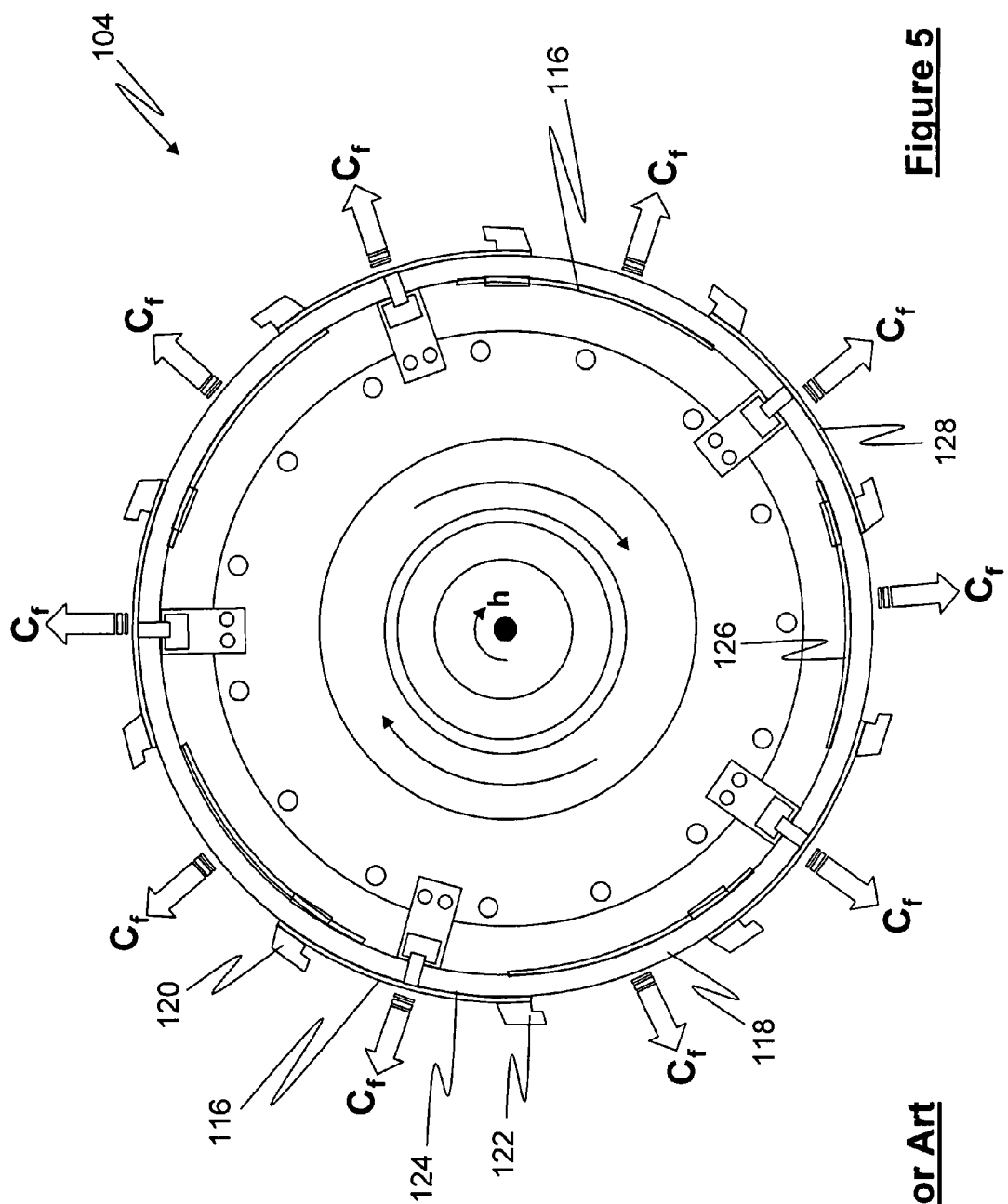
FIG. 5 is a top down view of the rotor alternator of FIG. 2, without the alternator windings.
Figure 6:
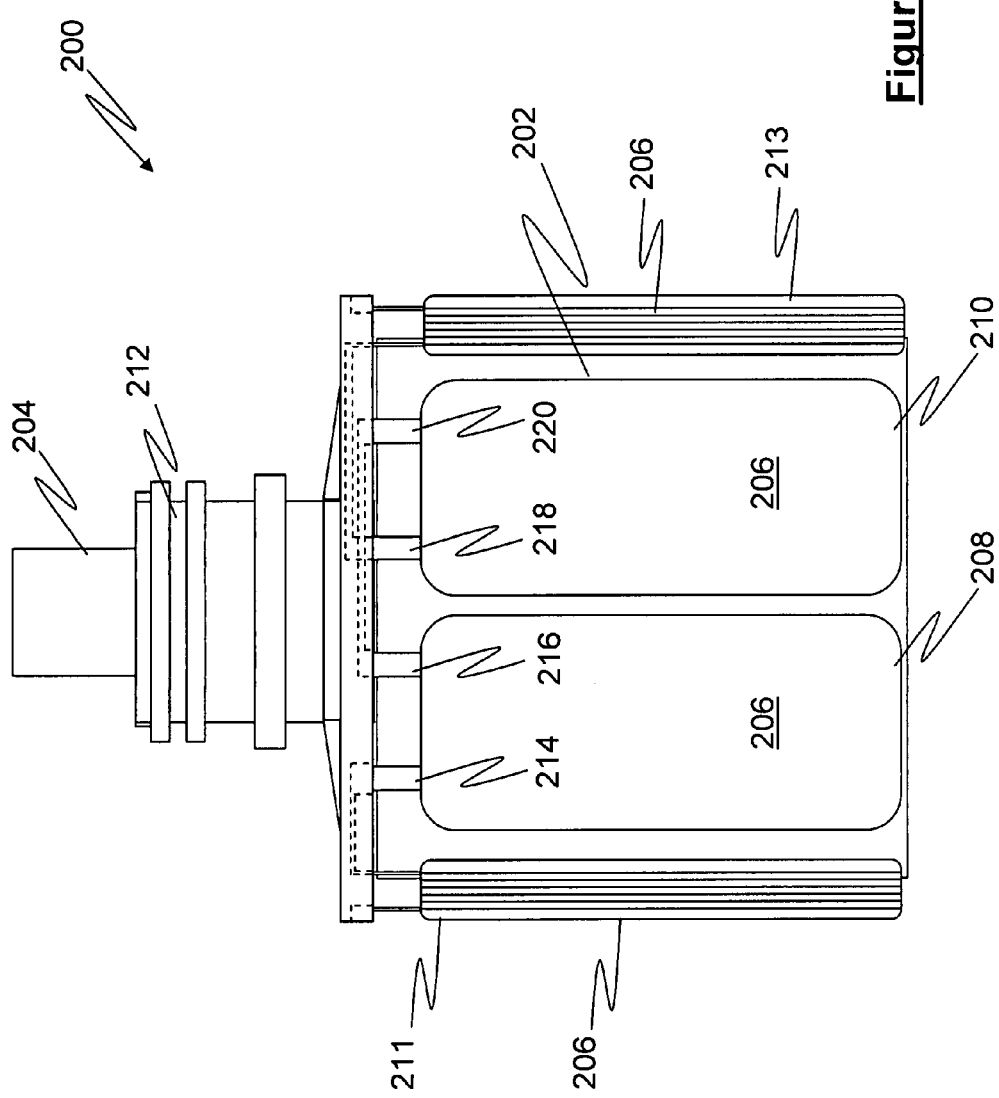
FIG. 6 is a side view of a rotor alternator incorporating a tie ring, in accordance with an exemplary embodiment.

Referring to FIG. 6, a portion of an alternator rotor 200 is illustrated and includes an alternator support structure 202, an alternator rotor shaft 204 and a plurality of alternator rotor winding sets 206, wherein plurality of alternator rotor winding sets 206 are non-movably associated with alternator support structure 202 and such that alternator rotor winding sets 206 are disposed to be evenly distributed along the external portion of alternator support structure 202. Alternator support structure 202 defines a shaft cavity 212 for non-movably containing alternator rotor shaft 204 such that when alternator rotor shaft 204 is rotated, the alternator support structure 202 and hence the plurality of alternator rotor winding sets 206 are rotated as well.

Plurality of alternator rotor winding sets 206 are shown and include a first rotor winding set 208 disposed adjacent a second rotor winding set 210, wherein first rotor winding set 208 includes a first winding first pole 214 and a first winding second pole 216 and wherein second rotor winding set 210 includes a second winding first pole 218 and a second winding second pole 220. Two additional rotor winding sets 211, 213 are also shown, wherein rotor winding set 211 is disposed to be separated from second rotor winding set 210 via first rotor winding set 208 and wherein rotor winding set 213 is disposed to be separated from first rotor winding set 208 via second rotor winding set 210.

Figure 7:
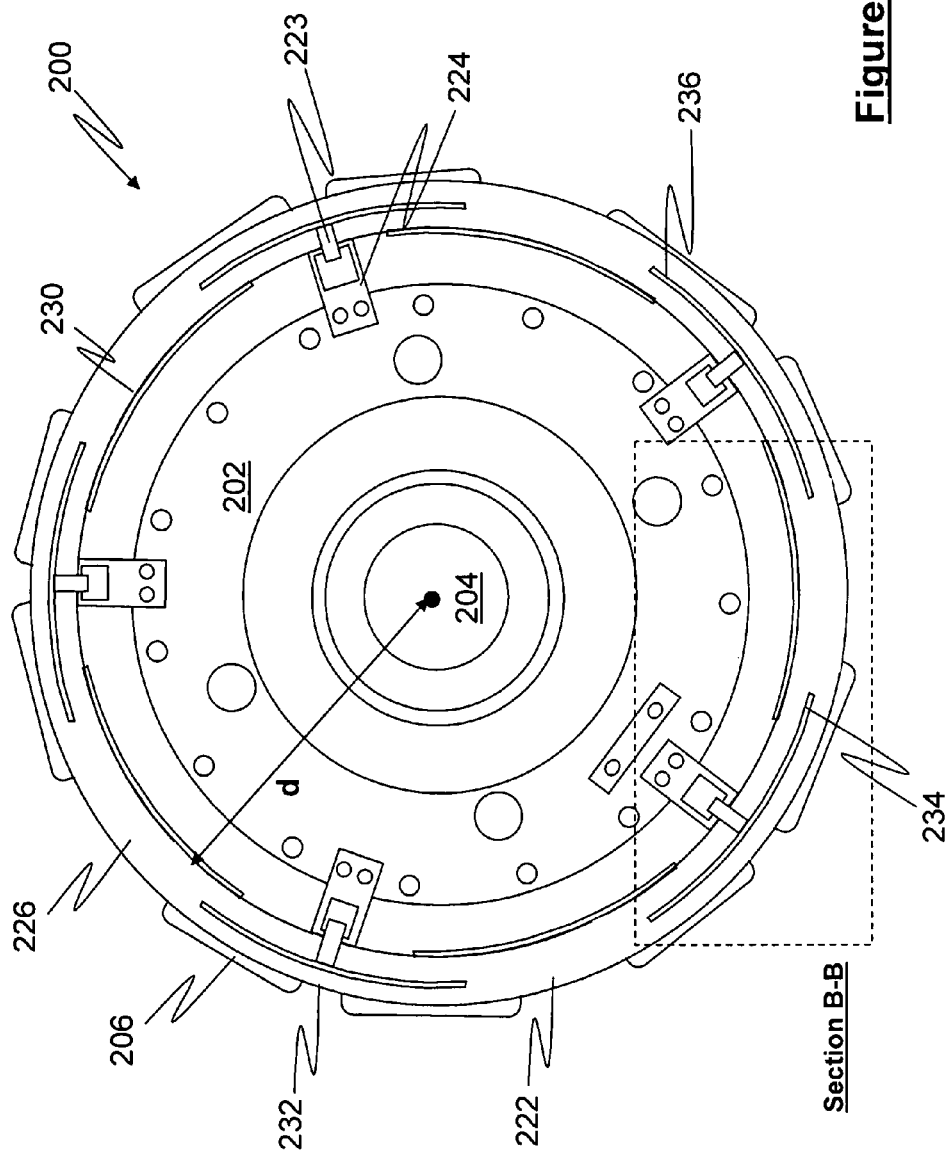
FIG. 7 is a top down view of the tie ring and the rotor alternator of FIG. 6.
Figure 8:
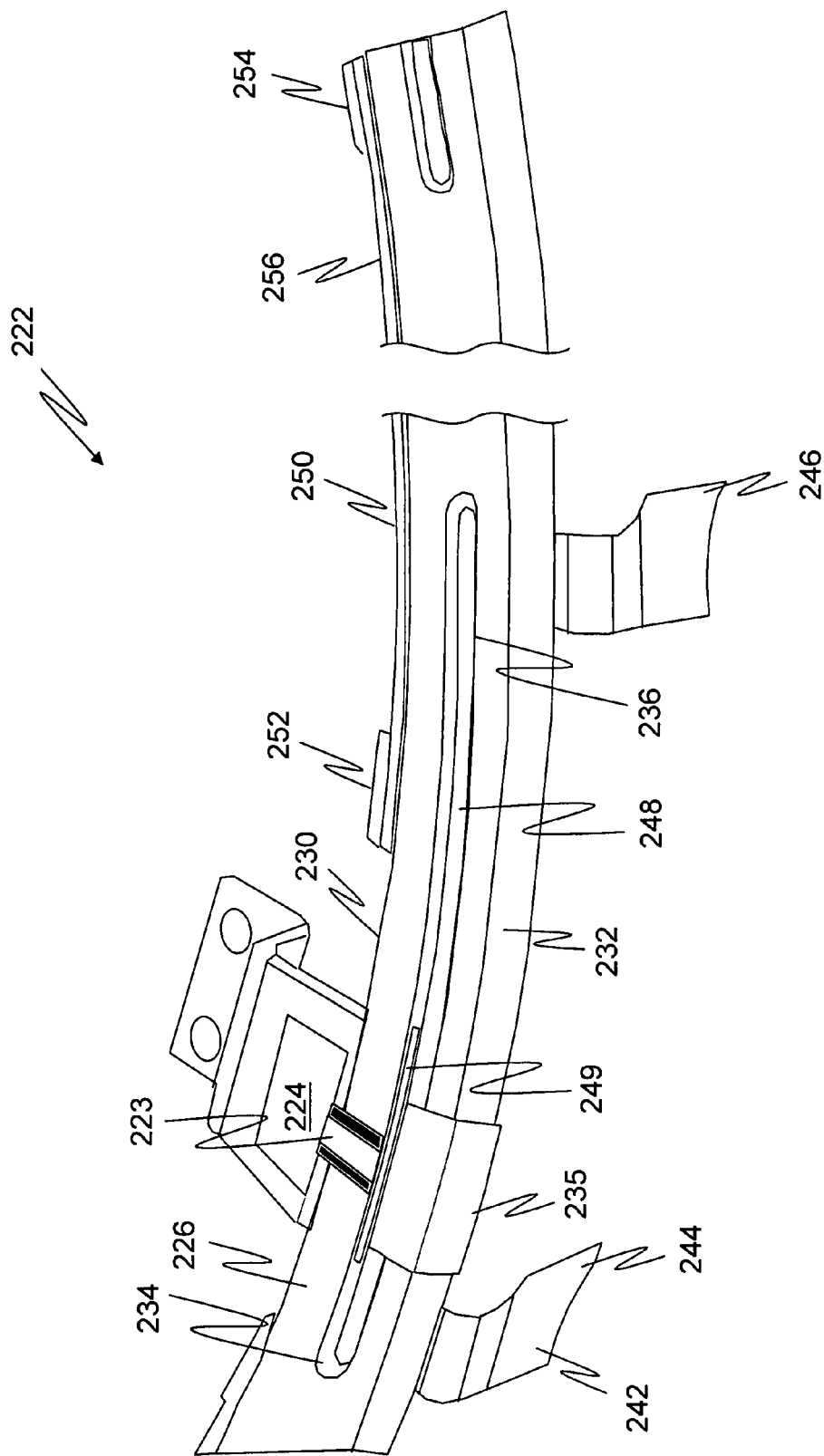
FIG. 8 is a sectional side perspective view of the tie ring and the rotor alternator of FIG. 6.
Figure 9:
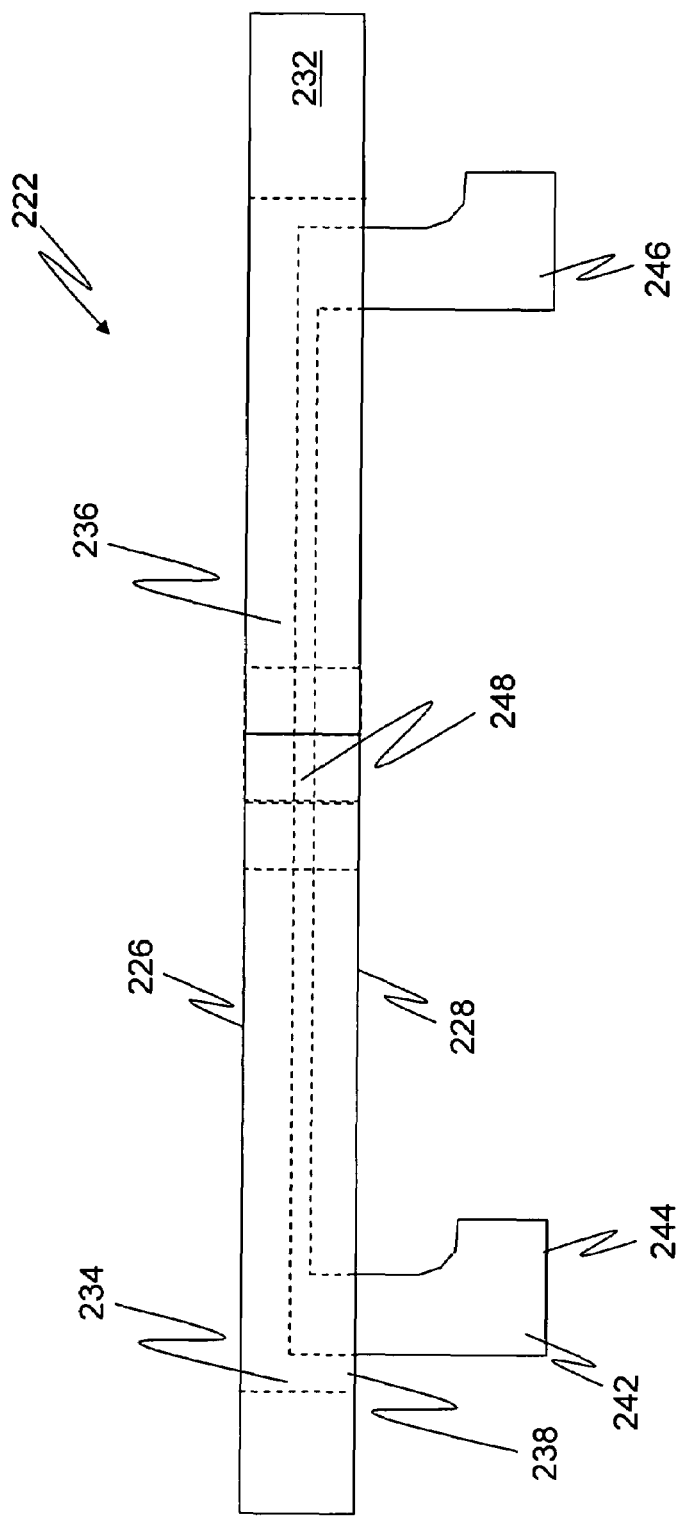
FIG. 9 is a cross-sectional side view of the tie ring and the rotor alternator of FIG. 6.

Referring to FIG. 7, FIG. 8 and FIG. 9, alternator rotor 200 also includes a tie ring 222 non-movably associated with alternator support structure 202 via at least one tie ring mounting device 224 such that tie ring 222 is disposed adjacently above plurality of alternator rotor winding sets 206. Although tie ring mounting device 224 is shown as being supportingly associated with tie ring 222 via a clamping device 223, tie ring mounting device 224 may be supportingly associated with tie ring 222 via any method or device suitable to the desired end purpose, such as adhesive, screws and/or bolts. Tie ring 222 includes a tie ring top surface 226, a tie ring bottom surface 228, a tie ring internal surface 230 and a tie ring external surface 232.

Tie ring 222 includes a tie ring diameter d and defines at least one ring cavity 234 having a top ring cavity opening 236 and a bottom ring cavity opening 238, wherein top ring cavity opening 236 is disposed on tie ring top surface 226 and bottom ring cavity opening 238 is disposed on tie ring bottom surface 228 such that tie ring top surface 226 is communicated with tie ring bottom surface 228. Tie ring 222 is disposed relative to alternator rotor 200 such that a portion of bottom ring cavity opening 238 is adjacent both first winding second pole 216 of first rotor winding set 208 and second winding second pole 220 of second rotor winding set 210.

Alternator rotor 200 also includes a first terminal connection strap 242 having a first strap first connection end 244 communicated with a first strap second connection end 246 via a strap body 248. Terminal connection strap 242 is associated with ring cavity 234 such that strap body 248 is disposed within ring cavity 234 and such that first strap first connection end 244 and first strap second connection end 246 are associated with bottom ring cavity opening 238 to allow first strap first connection end 244 to be connected with first winding second pole 216 and first strap second connection end 246 to be connected with second winding second pole 220 via bottom ring cavity opening 238. It should be appreciated that terminal connection strap 242 is associated with ring cavity 234 via an adhesive tape 235 such that terminal connection strap 242 is allowed to expand and contract relative to tie ring 222. Moreover, a silicon material 249 is disposed between clamping device 223 and strap body 248. The adhesive tape 235 acts to insulate strap body 248 from clamping device 223 and the silicon material 249 acts to reinforce that insulation as well.

A second terminal connection strap 250 is included, wherein second terminal connection strap 250 includes a second strap first connection end 252 communicated with a second strap second connection end 254 via a second strap body 256. Second strap body 256 is non-movably disposed against tie ring internal surface 230 such that second strap first connection end 252 is connected with second winding first pole 218 and such that second strap second connection end 254 is connected with the second winding first pole of rotor winding set 213.

Figure 10:
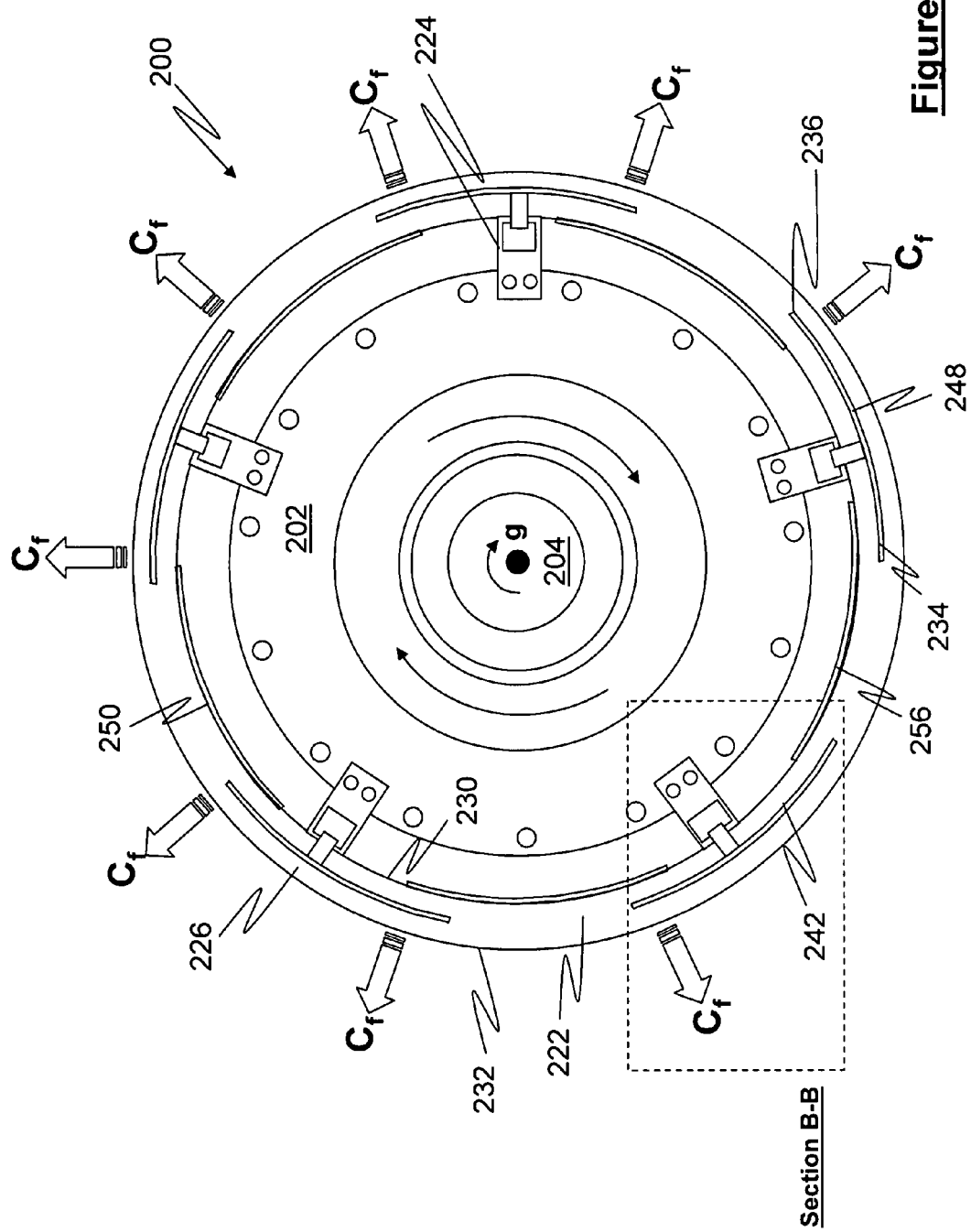
FIG. 10 is a top down view of the tie ring and the rotor alternator of FIG. 6, without the windings.

Referring to FIG. 8 and FIG. 10, alternator rotor 200 is shown rotating in the clockwise direction about an axis of rotation g which is equivalent to the axis of rotation of alternator rotor shaft 204. As alternator rotor 200 rotates, a centrifugal force $C_f$ (represented by the arrows in FIG. 10) is generated by the rotational motion and is applied to the components of alternator rotor 200 including first terminal connection strap 242 and second terminal connection strap 250. This centrifugal force $C_f$ is directed away from the axis of rotation g in a direction perpendicular to tie ring external surface 232. Because second strap body 256 of second terminal connection strap 250 is disposed against tie ring internal surface 230 the centrifugal force $C_f$ pushing against second strap body 256 is equalized by the tie ring internal surface 230. Similarly, because first strap body 248 of first terminal connection strap 242 is disposed entirely within ring cavity 234, the centrifugal force $C_f$ being applied to first strap body 248 causes first strap body 248 to push against the outward most cavity wall of ring cavity 234. As such, the outward most cavity wall of ring cavity 234 acts to counteract the centrifugal forces $C_f$ being applied to first strap body 248 and reduces the centrifugal stresses being applied to first strap first connection end 244 and first strap second connection end 246.

It is contemplated that alternator rotor 200 may include ten rotor winding sets, five strap cavities and ten terminal connection straps, wherein each of the five strap cavities are associated with two separate rotor winding sets and wherein the five strap cavities may be disposed to be evenly distributed along tie ring diameter d.

It should be appreciated that terminal connection straps 218 may be constructed, at least in part, from any conductive material or combination of materials suitable to the desired end purpose, such as copper. It should also be appreciated that first strap first connection end 244 is conductively communicated with first strap second connection end 246. Moreover, tie ring 226 may be constructed using any flexible, non-conductive material and/or combination of materials suitable to the desired end purpose, such as a fiberglass and/or a polymer material.

It should be further appreciated that terminal connection straps 218 may be associated with tie ring 226 using any method and/or device suitable to the desired end purpose, such as an adhesive, tape, clip and/or clamp.

Figure 11:
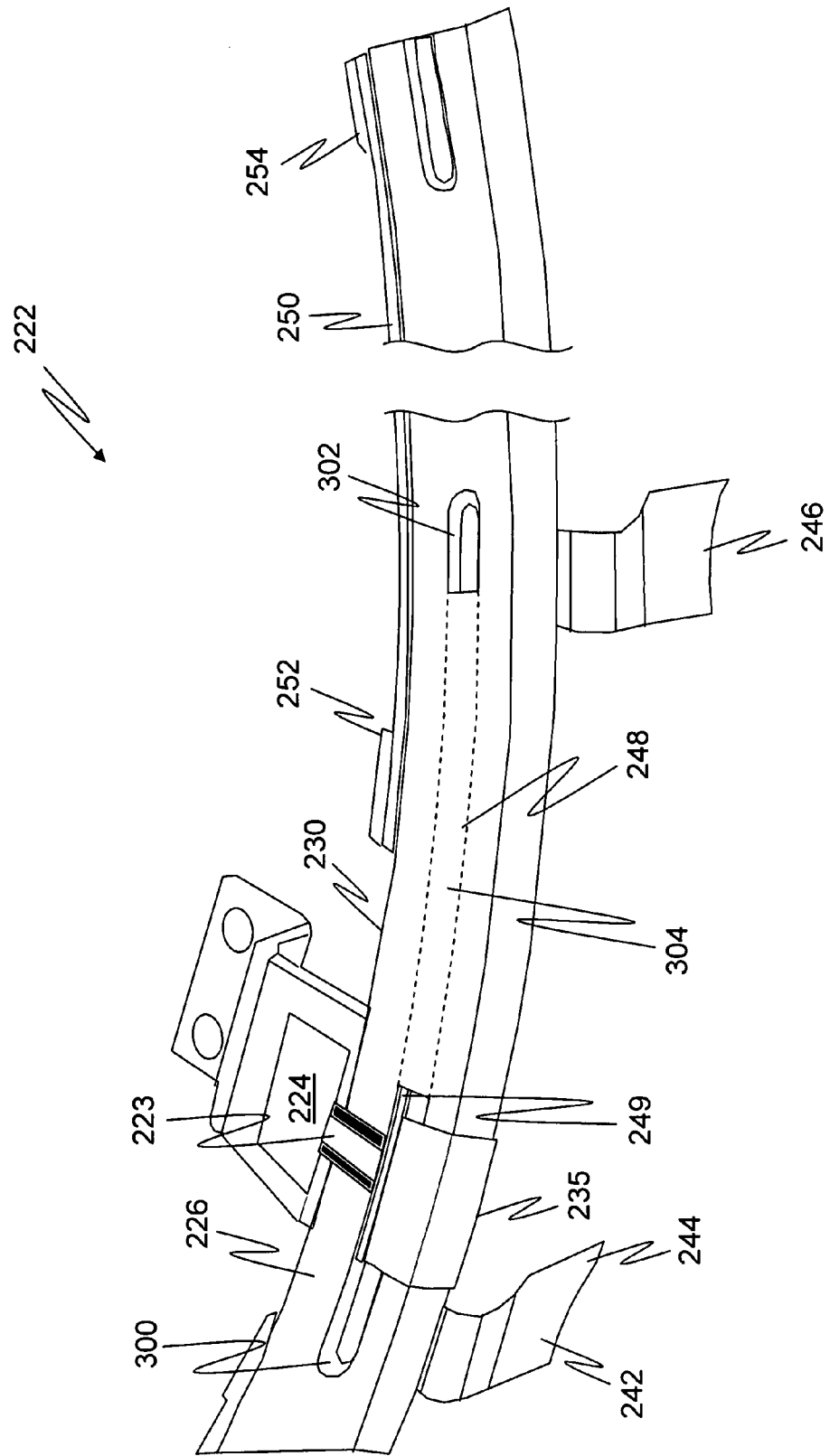
FIG. 11 is a sectional side perspective view of a tie ring in accordance with an alternative embodiment.

Referring to FIG. 11, it should also be appreciated that ring cavity 234 may be designed such that top ring cavity opening 236 includes a first top ring cavity opening 300 separated from a second top ring cavity opening 302 by a ring cavity top 304. In this case, when first terminal connection strap 242 is disposed entirely within ring cavity 234, first strap body 248 may be securely contained within ring cavity 234 via ring cavity top 304, thereby eliminating the need to secure first strap body 248 within ring cavity 234 with tape or clamps. This is because ring cavity top 304 is sized and shaped to allow first strap body 248 to expand and contract. Ring cavity top 304 may or may not be removable, wherein if ring cavity top 304 is removable, then first terminal connection strap 242 would be disposed within ring cavity 234 and ring cavity top 304 would be securely disposed over ring cavity 234 via any method and/or device suitable to the desired end purpose, such as clips, screws adhesive and/or snaps. If ring cavity top 304 is not removable, then first terminal connection strap 242 would be disposed within ring cavity 234 by 'snaking' first terminal connection strap 242 under ring cavity top 304.

While the invention has been described with reference to an exemplary embodiment, it will be understood by those skilled in the art that various changes, omissions and/or additions may be made and equivalents may be substituted for elements thereof without departing from the spirit and scope of the invention. In addition, many modifications may be made to adapt a partieular situation or material to the teachings of the invention without departing from the scope thereof. Therefore, it is intended that the invention not be limited to the partieular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A tie ring assembly, comprising:
  a tie ring structure defining at least one strap cavity, said tie ring structure including a tie ring top surface and a tie ring bottom surface, wherein said tie ring top surface defines at least one top surface opening and said tie ring bottom surface defines at least one bottom surface opening, said at least one bottom surface opening being communicated with said at least one top surface opening via said at least one strap cavity; and at least one terminal connection strap, said at least one terminal connection strap including a first connection strap end connected to a second connection strap end via a strap body, wherein said at least one terminal connection strap is disposed within said at least one strap cavity such that strap body is contained within said at least one strap cavity and such that said first connection strap end and said second connection strap end is communicated with said at least one bottom surface opening.

2. The tie ring assembly of claim 1. wherein said at least one terminal connection strap is securingly disposed within said at least one strap cavity via at least one of tape, adhesive, and clamp.

3. The tie ring assembly of claim 1, wherein said at least one terminal connection strap is constructed at least in part from a conductive material such that said first connection strap end is conductively connected to said second connection strap end.

4. The tie ring assembly of claim 3, wherein said conductive material is copper.

5. The tie ring of claim 1, wherein said tie ring structure includes a tie ring diameter and wherein said at least one strap cavity includes live strap cavities, wherein said five strap cavities are disposed to be evenly distributed along said tie ring diameter.

6. The tie ring of claim 5, wherein said at least one strap cavity is sized and shaped to contain said at least one terminal connection strap.

7. The tie ring of claim 1, wherein said tie ring structure is constructed at least in part from at least one of a polymer material and a fiberglass material.

8. The tie ring of claim 1, wherein said tie ring structure is constructed at least in part from a flexible, non-conductive material.

9. An alternator assembly, comprising:

an alternator support structure, wherein said alternator support structure defines an alternator shaft cavity and includes an alternator support structure external portion;

an alternator shaft, wherein said alternator shaft is non movably disposed within said alternator shaft cavity;

a plurality of alternator rotor windings, wherein said plurality of said alternator rotor windings are disposed to be non-movably associated with said alternator support structure external portion such that said alternator rotor windings are evenly distributed along said alternator support structure external portion; and a tie ring assembly, wherein said tie ring assembly includes a tie ring structure defining at least one strap cavity, said tie ring structure including a tie ring top surface and a tie ring bottom surface. wherein said tie ring top surface defines at least one top surface opening and said tie ring bottom surface defines at least one bottom surface opening, said at least one bottom surface opening being communicated with said at least one top surface opening via said at least one strap cavity and at least one terminal connection strap, said at least one terminal connection strap including a first connection strap end connected to a second connection strap end via a strap body, wherein said at least one terminal connection strap is disposed within said at least one strap cavity such that said strap body is contained within said at least one strap cavity and such that said first connection strap and said second connection strap end is communicated with said at least one bottom surface opening.

10. The tie ring assembly of claim 9, wherein said at least one terminal connection strap is securingly disposed within said at least one strap cavity at least one of tape, adhesive, and clamp.

11. The tie ring assembly of claim 9, wherein said at least one terminal connection strap is constructed at least in part from a conductive material such that said first connection strap end is conductively connected to said second connection strap end.

12. The tie ring assembly of claim 11, wherein said conductive material is copper.

13. The tie ring of claim 9, wherein said tie ring structure includes a tie ring diameter and wherein said at least one strap cavity includes live strap cavities, wherein said five strap cavities are disposed to be evenly distributed along said tie ring diameter.

14. The tie ring of claim 9, wherein said tie ring is associated with said alternator support structure via at least one tie ring mounting device and wherein at least one terminal connection strap is insulatively disposed within said at least one strap cavity to via an adhesive tape.

15. The tie ring of claim 9, wherein said tie ring structure is constructed at least in part from a flexible, non-conductive material.

* * * * *